United States Patent
Wu et al.

(10) Patent No.: US 11,804,077 B2
(45) Date of Patent: Oct. 31, 2023

(54) GENERIC GESTURE DETECTING METHOD AND GENERIC GESTURE DETECTING DEVICE

(71) Applicant: KaikuTek Inc., Taipei (TW)

(72) Inventors: Yu Feng Wu, Zhubei (TW); Chieh Wu, Hsinchu (TW); Ling Ya Huang, Chiayi (TW); Fang Li, New Taipei (TW); Guan-Sian Wu, Taichung (TW); Wen-Yen Chou, New Taipei (TW); Wen-Jyi Hwang, Taipei (TW); Chun-Hsuan Kuo, San Diego, CA (US); Mike Chun-Hung Wang, Taipei (TW)

(73) Assignee: KaiKuTek Inc., Taipei (TW)

( * ) Notice: Subject to any disclaimer, the term of this patent is extended or adjusted under 35 U.S.C. 154(b) by 223 days.

(21) Appl. No.: 17/220,504

(22) Filed: Apr. 1, 2021

(65) Prior Publication Data

US 2022/0318544 A1  Oct. 6, 2022

(51) Int. Cl.
*G06K 9/00* (2022.01)
*G06V 40/20* (2022.01)
(Continued)

(52) U.S. Cl.
CPC .............. *G06V 40/28* (2022.01); *G01S 7/415* (2013.01); *G06F 18/22* (2023.01); *G06V 10/40* (2022.01); *G06V 40/10* (2022.01); *G06V 40/167* (2022.01)

(58) Field of Classification Search
CPC ........ G06V 40/28; G06V 10/40; G06V 40/10; G06V 40/167
See application file for complete search history.

(56) References Cited

U.S. PATENT DOCUMENTS 8,891,868 B1 * 11/2014 Ivanchenko ............ G06F 18/00
  382/168
10,037,458 B1 * 7/2018 Mahmoud ............ G06V 40/113
(Continued)

FOREIGN PATENT DOCUMENTS

CN   106295684 A  *  1/2017   ............. G01S 13/89
CN   106339618 A  *  1/2017   ............. G06F 21/32
(Continued)

OTHER PUBLICATIONS

Short-Range Radar-Based Gesture Recognition System Using 3D CNN with Triplet Loss, Souvik Hazra et al., IEEE, 2019, pp. 125623-125633 (Year: 2019).*
(Continued)

*Primary Examiner* — Jayesh A Patel
(74) *Attorney, Agent, or Firm* — RABIN & BERDO, P.C.

(57) ABSTRACT

A generic gesture detecting method executed by a generic gesture detecting device includes steps of: receiving a current sensing signal from a sensing unit; generating a current image according to the current sensing signal; determining whether the current image is similar with a stored image stored in a memory unit; when the current image is similar with the stored image, detecting the current image and the stored image to be a gesture signal; when the current image is different from the stored image, storing the current image into the memory unit, and returning to the step of receiving a current sensing signal. Since the generic gesture detecting device can automatically detect the gesture signal, the user may not need to enable a detecting time period before implementing a command motion. Therefore, the user can make the command motion without enabling the detecting time period, and the convenience can be increased.

8 Claims, 28 Drawing Sheets

(51) Int. Cl.
*G01S 7/41* (2006.01)
*G06V 10/40* (2022.01)
*G06V 40/10* (2022.01)
*G06V 40/16* (2022.01)
*G06F 18/22* (2023.01)

(56) References Cited

U.S. PATENT DOCUMENTS

| | | | | |
|---|---|---|---|---|
| 11,003,307 | B1* | 5/2021 | Ravasz | G06F 3/0482 |
| 11,080,556 | B1* | 8/2021 | Gillian | G06F 18/25 |
| 2011/0156867 | A1* | 6/2011 | Carrizo | H04L 63/0861 |
| | | | | 345/173 |
| 2012/0114255 | A1* | 5/2012 | Kimura | G06V 40/161 |
| | | | | 382/203 |
| 2012/0280900 | A1* | 11/2012 | Wang | G06F 3/0488 |
| | | | | 345/156 |
| 2014/0267009 | A1* | 9/2014 | DeLean | G06V 40/28 |
| | | | | 345/156 |
| 2015/0309579 | A1* | 10/2015 | Wang | G06V 40/20 |
| | | | | 345/156 |
| 2015/0310264 | A1* | 10/2015 | Aliseitchik | G06V 40/20 |
| | | | | 382/103 |
| 2016/0109954 | A1* | 4/2016 | Harris | G06V 20/20 |
| | | | | 345/156 |
| 2016/0283783 | A1* | 9/2016 | Yang | G06V 40/23 |
| 2017/0083102 | A1* | 3/2017 | Dow | G06F 3/017 |
| 2018/0082134 | A1* | 3/2018 | Sivaraman | G08G 1/005 |
| 2019/0242974 | A1* | 8/2019 | Tai | G06F 3/017 |
| 2019/0242975 | A1* | 8/2019 | Tai | G06N 3/045 |
| 2019/0244017 | A1* | 8/2019 | Tai | G06F 18/214 |
| 2020/0050842 | A1* | 2/2020 | Kim | G06V 10/82 |
| 2021/0311554 | A1* | 10/2021 | McFarland, Jr. | |
| | | | | G06Q 20/40145 |

FOREIGN PATENT DOCUMENTS

| | | | | |
|---|---|---|---|---|
| CN | 108344995 A | | 7/2018 | |
| CN | 109583436 A | * | 4/2019 | G01S 13/88 |
| CN | 109857251 A | | 6/2019 | |
| CN | 110765974 A | * | 2/2020 | G01S 13/88 |
| CN | 111695420 A | | 9/2020 | |
| CN | 111857354 A | * | 10/2020 | G01S 13/589 |
| CN | 112612365 A | | 4/2021 | |
| DE | 112015003655 T5 | * | 5/2017 | G01S 13/04 |
| EP | 2079004 A1 | * | 7/2009 | A63F 13/02 |
| EP | 2535787 A2 | * | 12/2012 | G06F 3/017 |
| EP | 3133474 A1 | * | 2/2017 | G01S 15/58 |
| EP | 3716020 A1 | * | 9/2020 | G01S 13/56 |
| WO | WO-2019108880 A1 | * | 6/2019 | G06F 3/015 |

OTHER PUBLICATIONS

Comparative Study of Hand Gesture Recognition System, Rafiqul Zaman Khan et al., AMU, 2012, pp. 203-213 (Year: 2012).*
Authentication in mobile devices through hand gesture recognition, J. Guerro-Casanova et al., Springer, 2012, pp. 65-83 (Year: 2012).*
Authentication Analysis using Input Gestures in Touch-Based Mobile Devices, Anwar Ur Rehman et al., DCS COMSATS, 2017, pp. 1-5 (Year: 2017).*
Dynamic Time Wrapping based Gesture Recognition, Saad Masood et al., IEEE, 2014, pp. 205-210 (Year: 2014).*
A model-based hand gesture recognition system, Chung-Lin Huang et al., Springer, 2000, pp. 243-258 (Year: 2000).*
Mm-Wave Radar Based Gesture Recognition:Development and Evaluation of a Low-Power, Low-Complexity System, Avishek Patra et al., mmNets, 2018, pp. 51-56 (Year: 2018).*
Visual gesture recognition, J Davis et al., IEEE, 1994, pp. 101-106 (Year: 1994).*
Design and Implementation of a Wireless Gesture Controlled Robotic Arm with Vision, Love Aggarwal et al., IJOCA, Oct. 2013, pp. 39-43 (Year: 2013).*
Whole-Home Gesture Recognition Using Wireless Signals, Qifan Pu et al., ACM, 1999, pp. 27-38 (Year: 1999).*
Bringing Gesture Recognition to All Devices, Bryce Kellogg et al., USENIX, Apr. 2014, pp. 303-316 (Year: 2014).*
Hazra et al., "Short-Range Radar-Based Gesture Recognition System Using 3D CNN With Triplet Loss", IEEE Access, Aug. 30, 2019, vol. 7, pp. 125623-125633.

* cited by examiner

GENERIC GESTURE DETECTING METHOD AND GENERIC GESTURE DETECTING DEVICE

BACKGROUND OF THE INVENTION

1. Field of the Invention

The present invention relates to a detecting method and a detecting device, and more particularly to a generic gesture detecting method and a generic gesture detecting device.

2. Description of the Related Art

A gesture recognition system generally receives sensing signals from a sensor to recognize motions of a user. For example, the gesture recognition system may receive sensing signals from the sensor, detect gesture signals from the sensing signals, and recognize the gesture signals to determine a command from the motion of the user.

A general method for detecting the gesture signals is using a detecting time period. For example, the user may enable a detecting time period, and the user needs to implement the motion during the detecting time period. Therefore, the sensor may sense all the motions made by the user, but only the motions occurring during the detecting time period can be detected to be the gesture signals.

However, each time the user wants to implement the command by the motions, the user needs to enable the detecting time period first, and then the user can make the motions that can be detected to be the gesture signals. It is very inconvenient for the user.

Therefore, the method for detecting the gesture signals needs to be further improved.

SUMMARY OF THE INVENTION

An objective of the present invention is to provide a generic gesture detecting method and a generic gesture detecting device. The present invention may automatically detect gestures signals form sensing signals, and a user can conveniently make motions that can be detected to be the gesture signals.

The generic gesture detecting method includes steps of:
receiving a current sensing signal from a sensing unit;
generating a current image according to the current sensing signal;
determining whether the current image is similar with a stored image stored in a memory unit;
when the current image is similar with the stored image, detecting the current image and the stored image to be a gesture signal;
when the current image is different from the stored image, storing the current image into the memory unit, and returning to the step of receiving a current sensing signal.

Further, the generic gesture detecting device includes a sensing unit, a memory unit, and a processing unit. The sensing unit senses a sensing signal. The memory unit stores a stored image. The processing unit is electrically connected to the sensing unit and the memory unit.

The processing unit receives the current sensing signal from the sensing unit, generates a current image according to the current sensing signal, and determines whether the current image is similar with the stored image stored in the memory unit.

When the current image is similar with the stored image, the processing unit detects the current image and the stored image to be a gesture signal.

When the current image is different from the stored image, the processing unit stores the current image into the memory unit, and receives the current sensing signal again.

Since the present invention can automatically detect the gesture signal by determining whether the current image is similar with a stored image, the user does not need to enable a detecting time period before implementing a command motion. Therefore, the user can make the command motion without enabling the detecting time period, and the convenience can be increased.

DETAILED DESCRIPTION OF THE INVENTION

Figure 1:
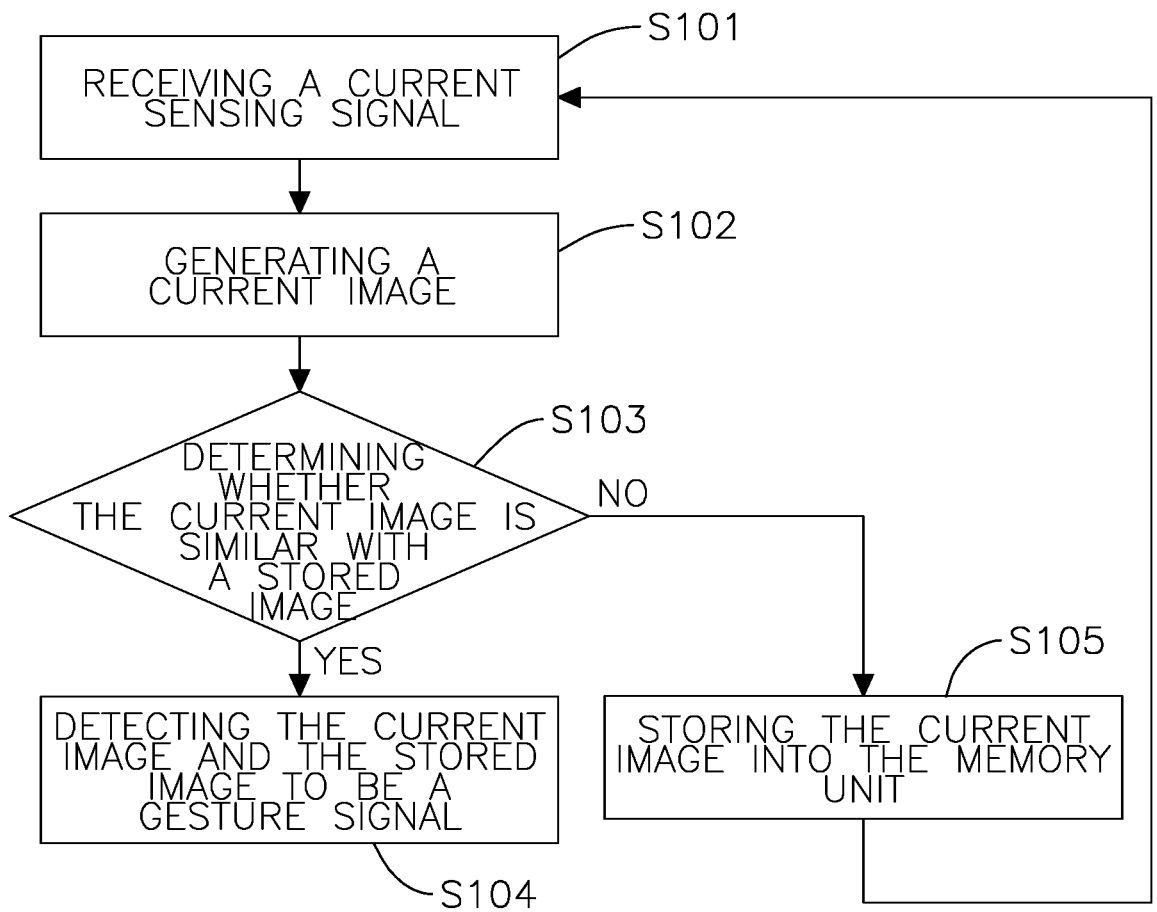
FIG. 1 is a flowchart of a generic gesture detecting method of the present invention.
Figure 2:
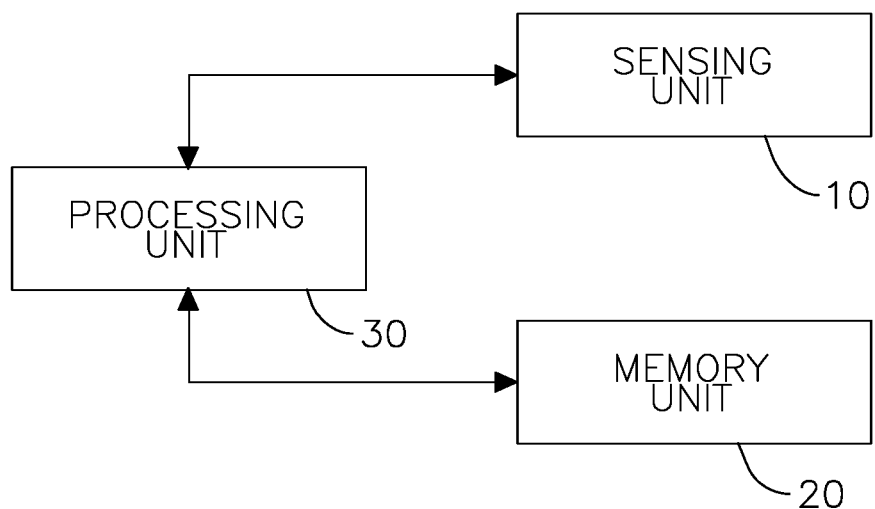
FIG. 2 is a block diagram of a generic gesture detecting device of the present invention.

With reference to FIGS. 1 and 2, the present invention relates to a generic gesture detecting method and a generic gesture detecting device.

The generic gesture detecting method includes steps of:
receiving a current sensing signal from a sensing unit (S101);
generating a current image according to the current sensing signal (S102);
determining whether the current image is similar with a stored image stored in a memory unit (S103);
when the current image is similar with the stored image, detecting the current image and the stored image to be a gesture signal (S104); and
when the current image is different from the stored image, storing the current image into the memory unit (S105), and returning to the step (S101).

Further, the generic gesture detecting device includes a sensing unit 10, a memory unit 20, and a processing unit 30. The sensing unit 10 senses a sensing signal. The memory unit 20 stores a stored image. The processing unit 30 is electrically connected to the sensing unit 10 and the memory unit 20.

The processing unit 30 receives the current sensing signal from the sensing unit 10, generates a current image according to the current sensing signal, and determines whether the current image is similar with the stored image stored in the memory unit 20.

When the current image is similar with the stored image, the processing unit 30 detects the current image and the stored image to be a gesture signal.

When the current image is different from the stored image, the processing unit 30 stores the current image into the memory unit 20, and receives the current sensing signal again.

The present invention can automatically detect the gesture signal by determining whether the current image is similar with a stored image, and the user does not need to enable a detecting time period before implementing a command motion. When the user makes a motion similar with a pre-defined motion, then the command motion can be implemented. Therefore, the user can make the command motion without enabling the detecting time period, and the convenience can be increased.

In an embodiment of the present invention, the generic gesture detecting method is executed by the processing unit 30 of the generic gesture detecting device. Further, the sensing unit 10 is a Doppler radar, the current image is a current range-doppler image (RDI), and the processing unit 30 comprises a feature extractor to generate the current RDI. For example, the feature extractor may be a digital signal processor (DSP).

Figure 3:
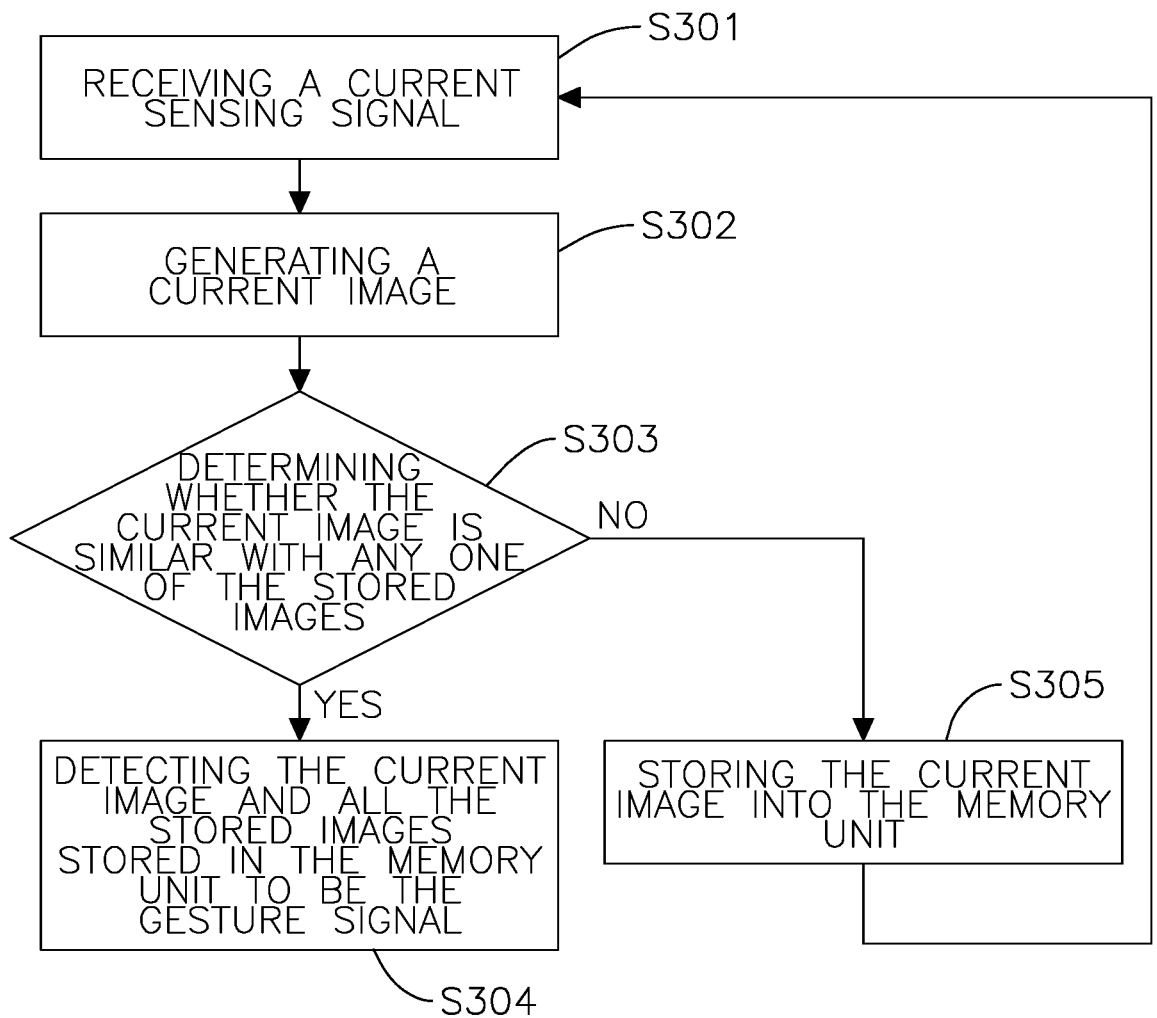
FIG. 3 is a flowchart of an embodiment of a return gesture of the generic gesture detecting method of the present invention.

With reference to FIG. 3, the generic gesture detecting method and the generic gesture detecting device may be used to detect a return gesture. The return gesture is a gesture which starts and ends at an original position or an original motion.

In the embodiment, the memory unit 20 stores a plurality of stored images. The generic gesture detecting method is executed by the processing unit 30, and includes steps of:
- receiving a current sensing signal from a sensing unit (S301);
- generating a current image according to the current sensing signal (S302);
- determining whether the current image is similar with any one of the stored images stored in the memory unit (S303);
- when the current image is similar with any one of the stored images stored in the memory unit, detecting the current image and all the stored images stored in the memory unit to be the gesture signal (S304);
- when the current image is different from any one of the stored images stored in the memory unit, storing the current image into the memory unit (S305), and returning to the step S301.

Since the current sensing signal sensed by the sensing unit 10 can be transformed to the current image and the current image can be stored into the memory unit 20, each position of the motion of the user can be saved in the memory unit 20. Therefore, when a current image is similar with any one of the stored images, the position of the motion of the user is returned to the original position. The original position means that the position had been passed by the user once, and the user has passed the position for the second time.

Therefore, when the user implements a gesture which starts and ends at a same position or a same motion, the user makes the return gesture. The present invention can automatically detect the current image and all the stored images stored in the memory unit 20 to be the gesture signal, and transmits the gesture signal to a gesture recognition device for recognizing the gesture signal. Further, after the gesture signal is detected, a next gesture can be continuously implemented by the user without a transition period. Therefore, the present invention can achieve a rapid detection of consecutive gestures without a transition period.

Figure 4A:
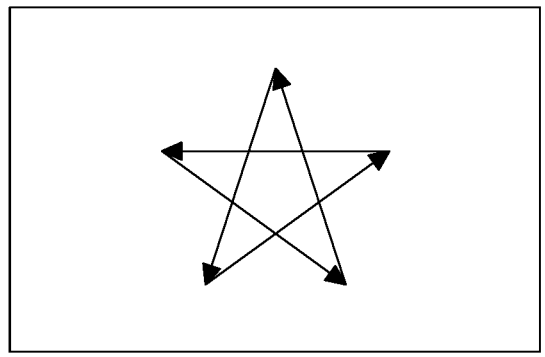
FIGS. 4A-4C are each respectively a schematic diagram of the return gesture.
Figure 4B:
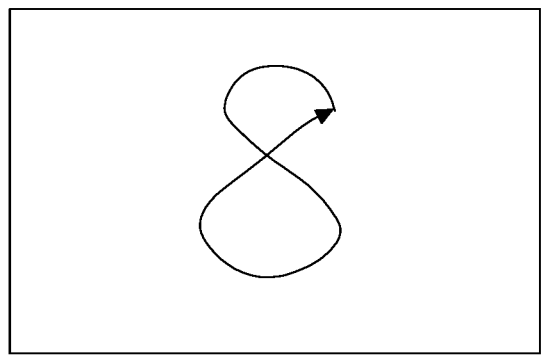
Figure 4C:
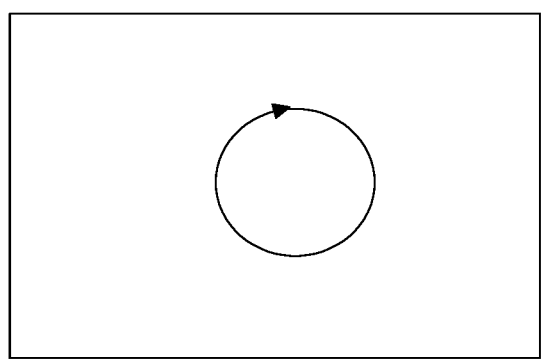

For example, with reference to FIGS. 4A-4C, the user may implement a sign-language based return gesture which starts and ends at a same position. In FIG. 4A, the user may draw a star sign in a sensing area of the sensing unit 10. In FIG. 4B, the user may draw a figure-8 sign in the sensing area of the sensing unit 10. In FIG. 4C, the user may draw a circle sign in the sensing area of the sensing unit 10. When the above-mentioned signs are drawn by the user, the user implements the return gesture.

Figure 5A:
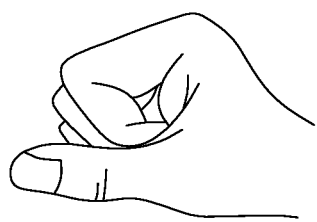
FIGS. 5A-5M are each respectively a schematic diagram of another return gesture.
Figure 5A:
Figure 5A:
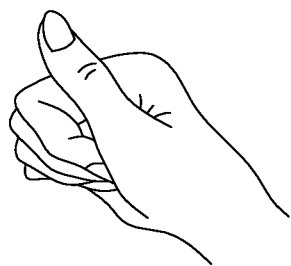
Figure 5A:
Figure 5A:
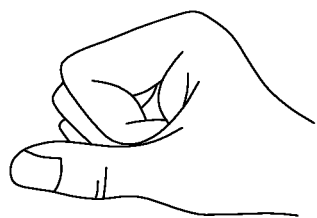

For example, with reference to FIGS. 5A-5M, the user may implement a communication-based return gesture which starts and ends at a same motion. In FIG. 5A, the user may make a rubbing gesture in the sensing area of the sensing unit 10.

Figure 5B:
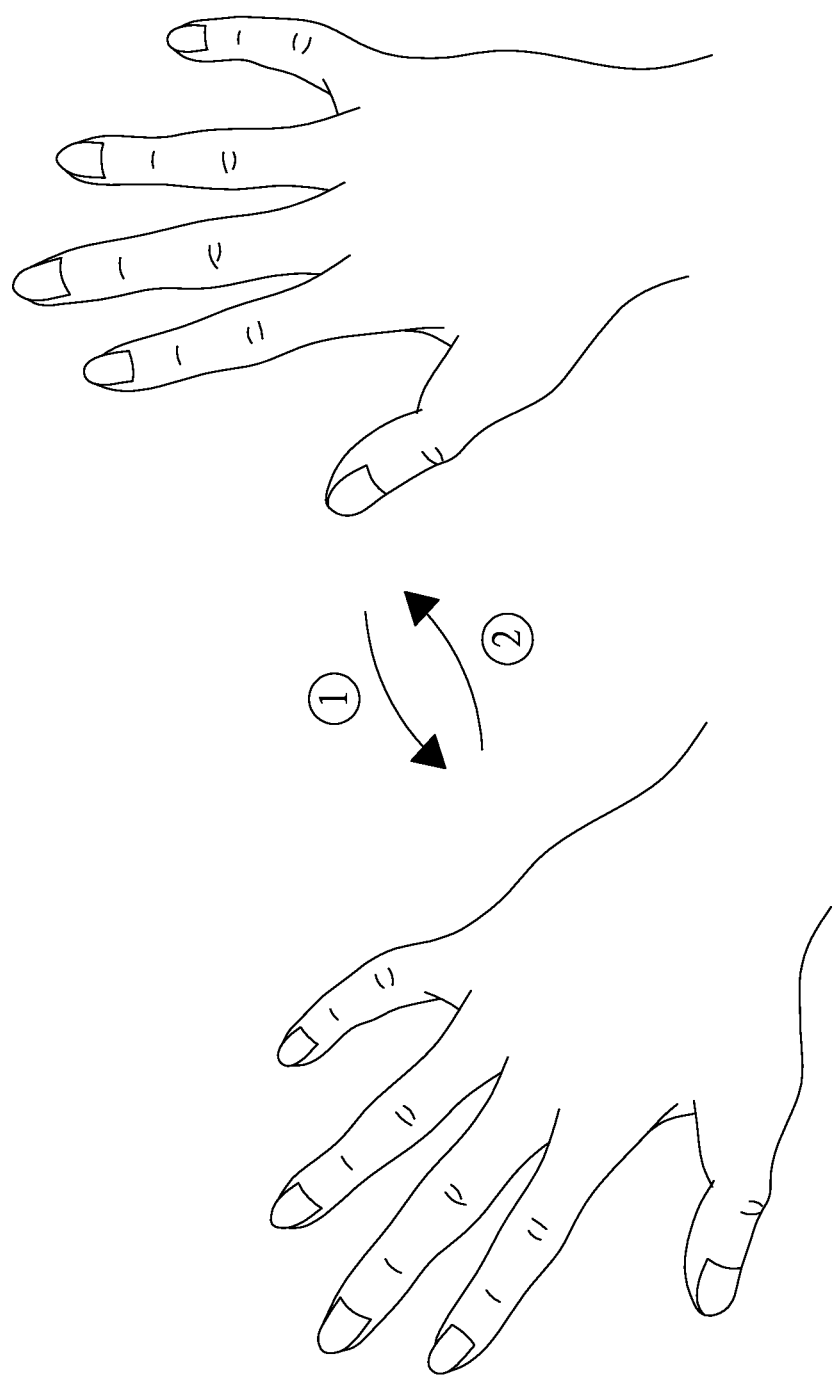

In FIG. 5B, the user may make a shake gesture in the sensing area of the sensing unit 10, and the shake gesture is horizontally shaking a hand.

Figure 5C:
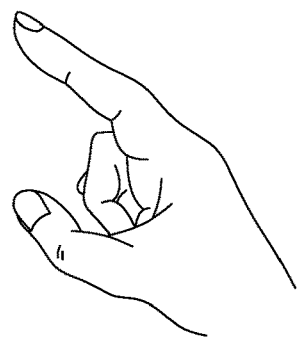
Figure 5C:
Figure 5C:
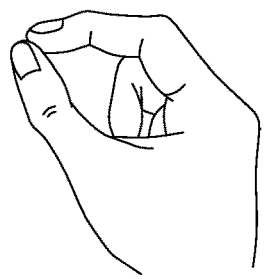
Figure 5C:
Figure 5C:
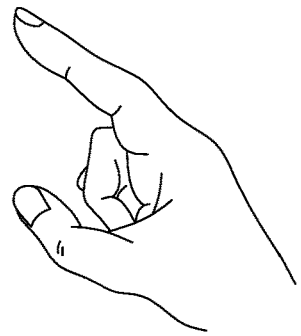
Figure 5D:
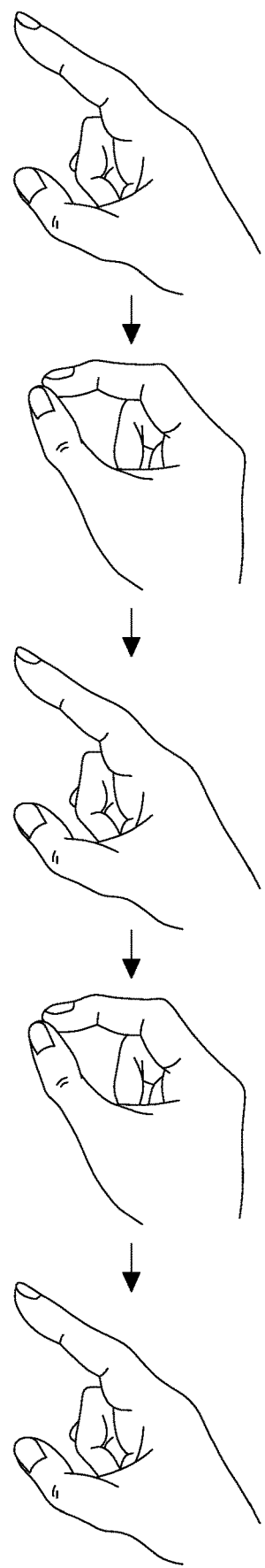

In FIG. 5C, the user may make a pinch gesture in the sensing area of the sensing unit 10. In FIG. 5D, the user may make a double pinch gesture in the sensing area of the sensing unit 10.

Figure 5E:
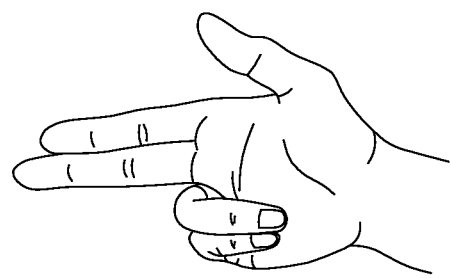
Figure 5E:
Figure 5E:
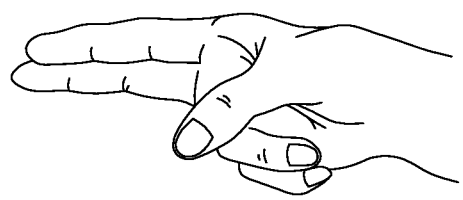
Figure 5E:
Figure 5E:
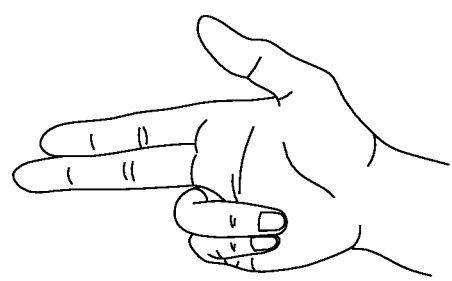

In FIG. 5E, the user may make a shooting gesture in the sensing area of the sensing unit 10.

Figure 5F:
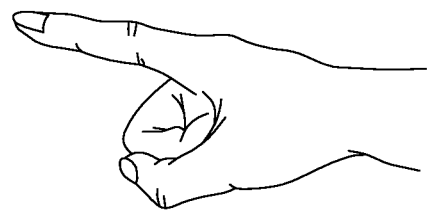
Figure 5F:
Figure 5F:
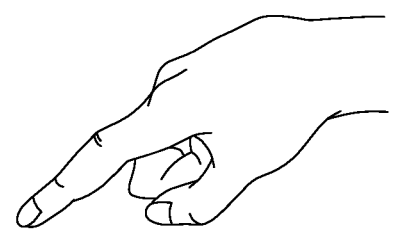
Figure 5F:
Figure 5F:
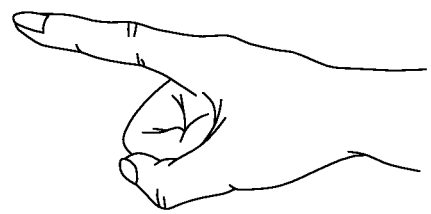

In FIG. 5F, the user may make a click gesture in the sensing area of the sensing unit 10.

Figure 5G:
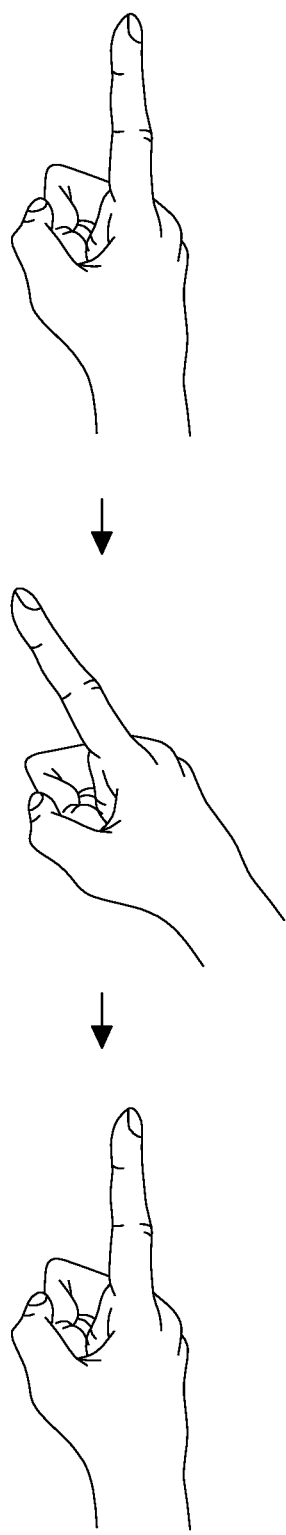
Figure 5H:
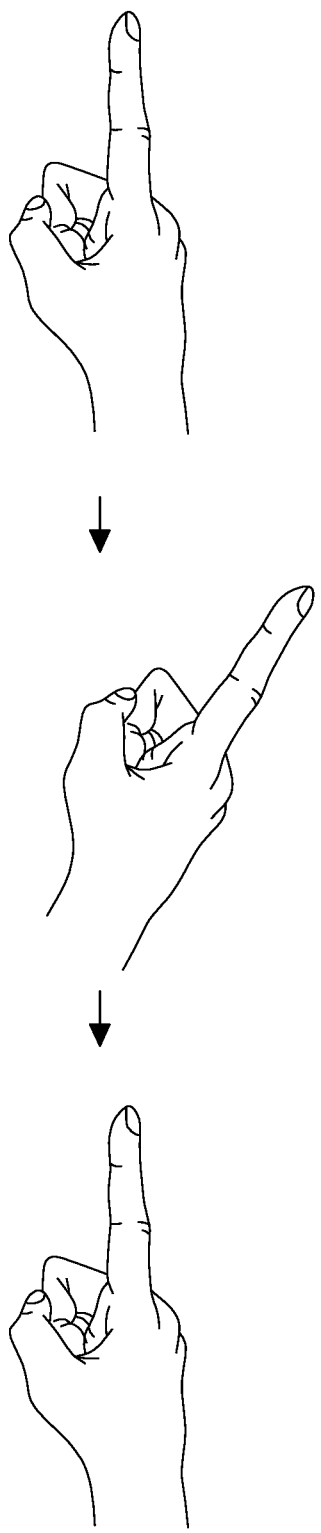

In FIG. 5G, the user may make a left swipe gesture in the sensing area of the sensing unit 10. In FIG. 5H, the user may make a right swipe gesture in the sensing area of the sensing unit 10.

Figure 5I:
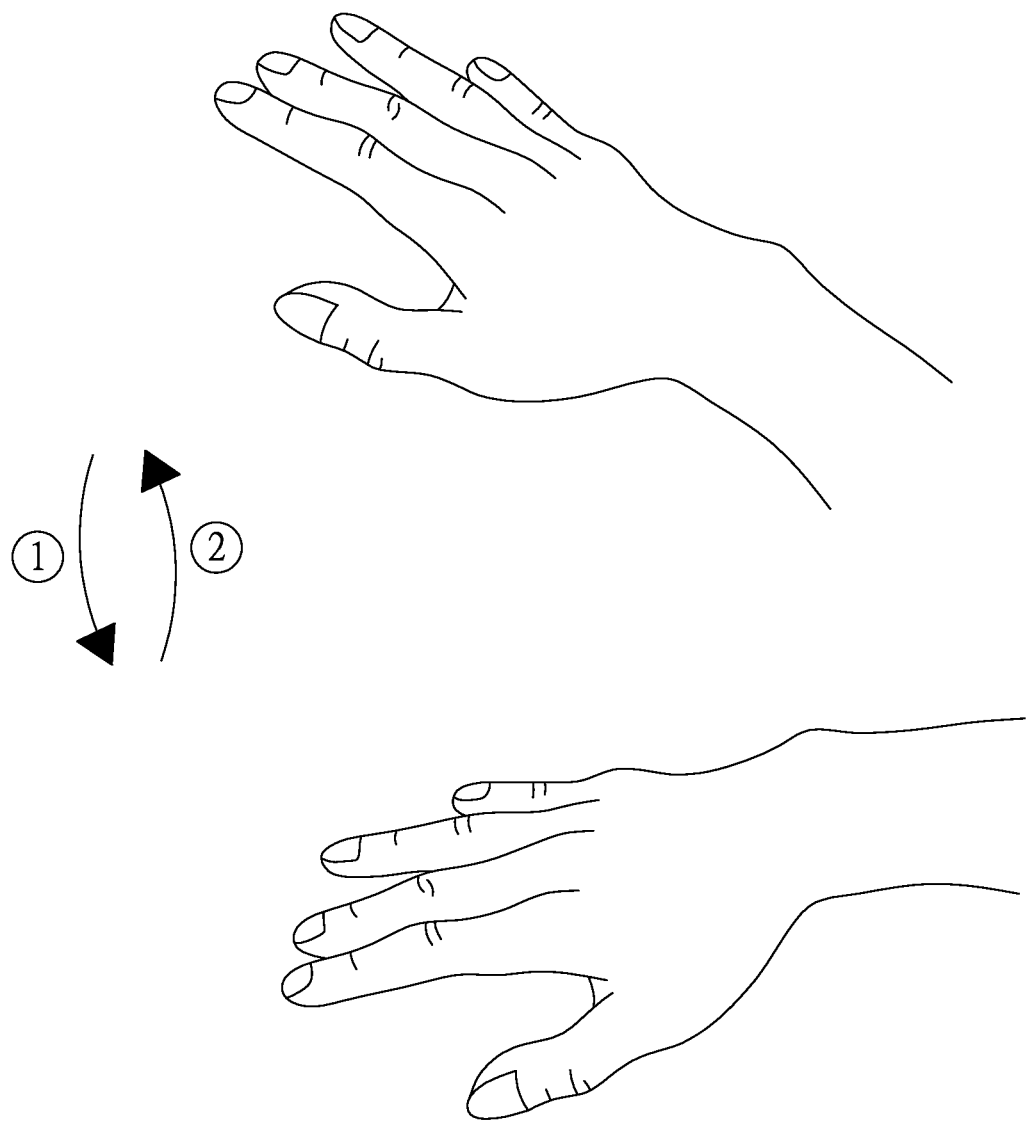

In FIG. 5I, the user may make a pat gesture in the sensing area of the sensing unit 10, and the pat gesture is vertically shaking a hand.

Figure 5J:
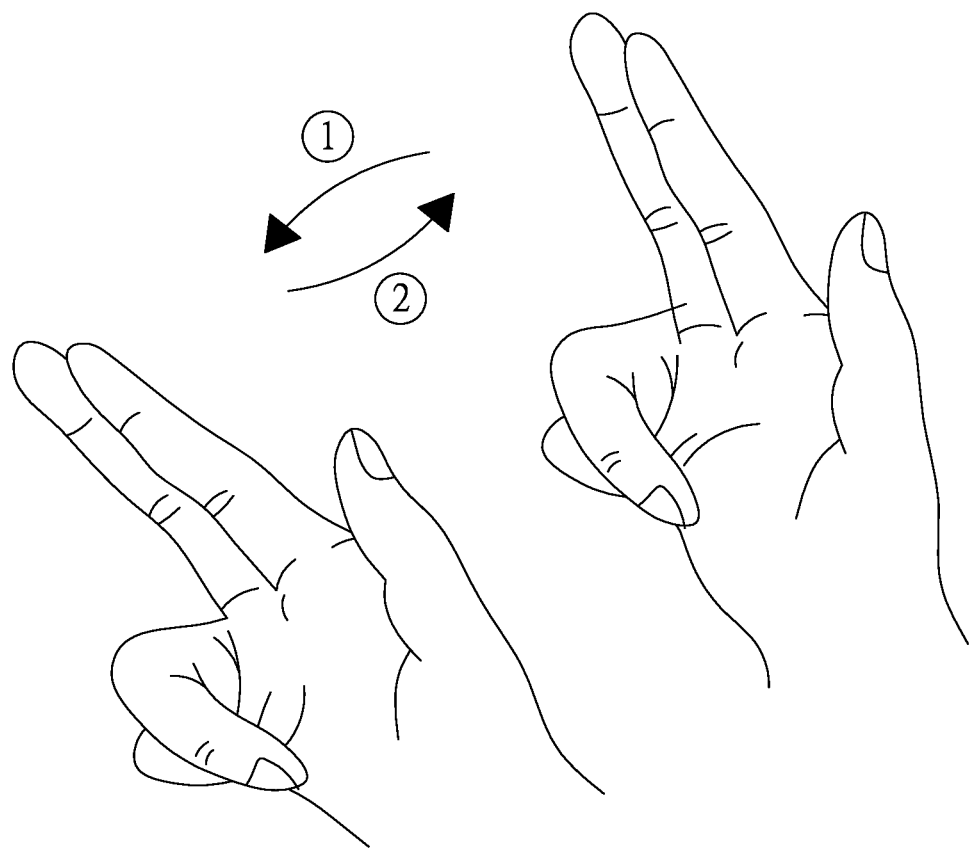
Figure 5K:
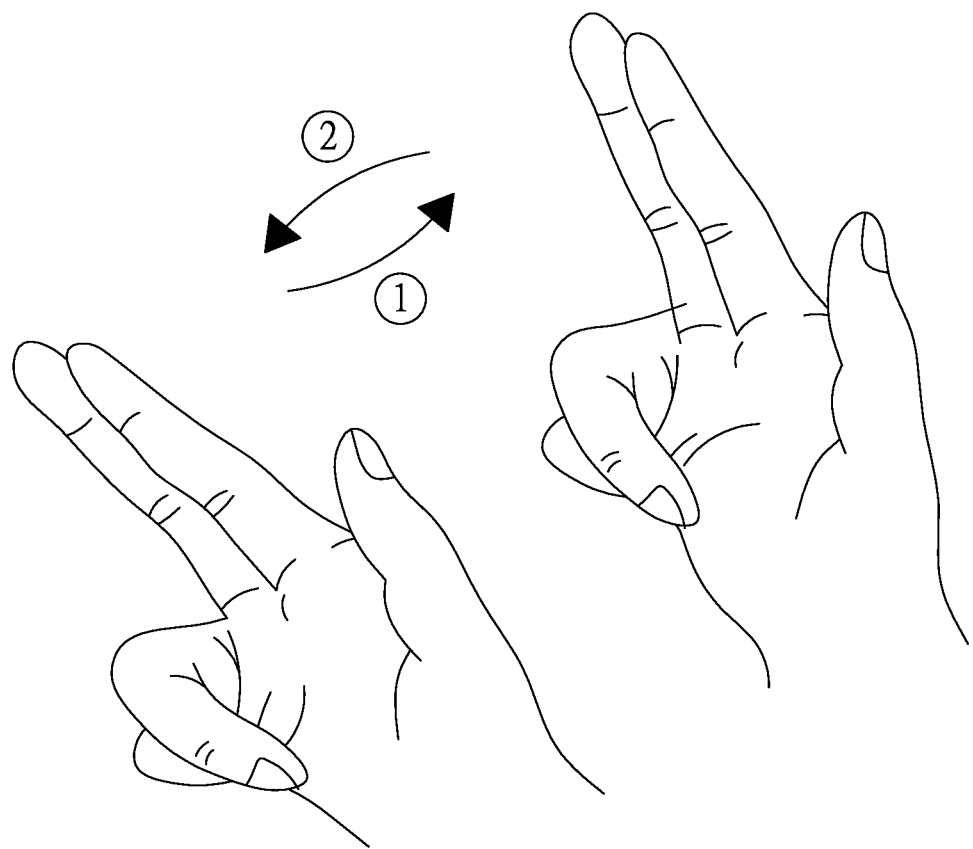
Figure 5L:
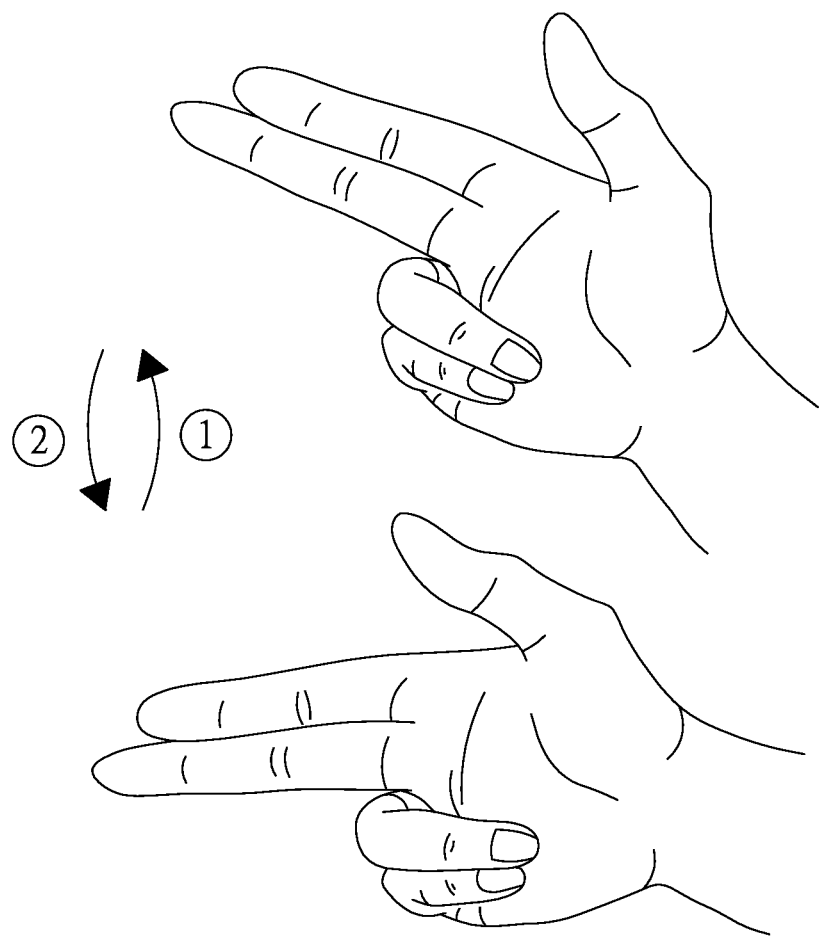
Figure 5M:
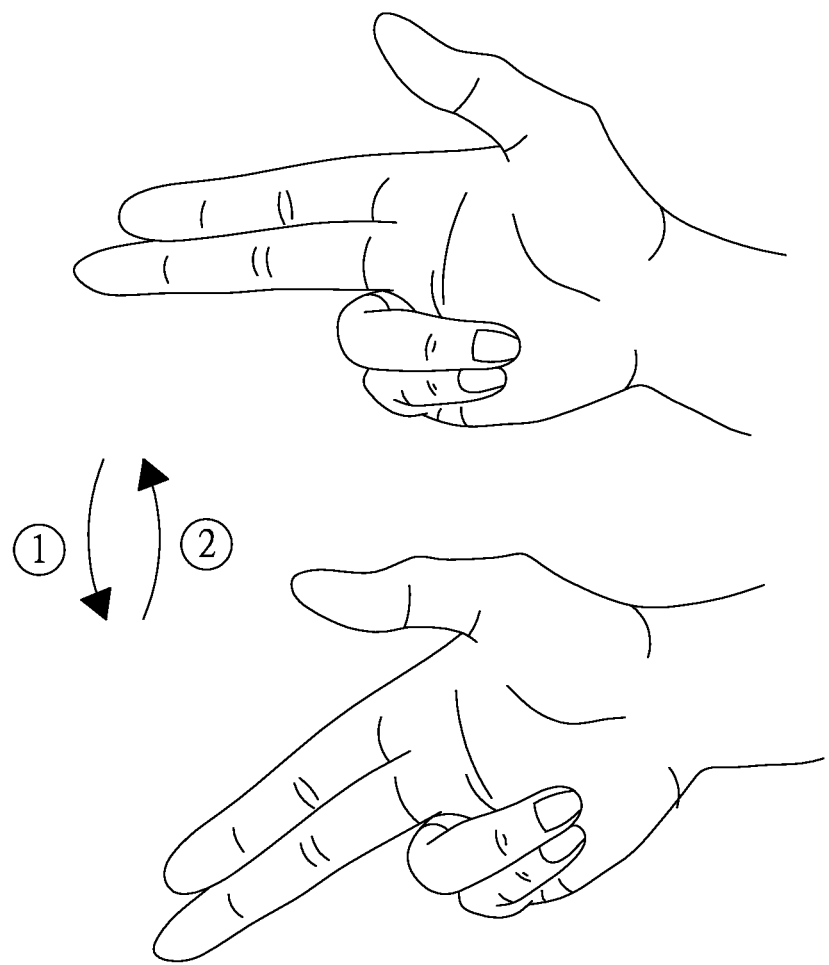

In FIG. 5J, the user may make a left shift gesture in the sensing area of the sensing unit 10, and the left shift gesture is firstly left shifting a hand, and secondly right shifting the hand. In FIG. 5K, the user may make a right shift gesture in the sensing area of the sensing unit 10, and the right shift gesture is firstly right shifting a hand, and secondly left shifting the hand. In FIG. 5L, the user may make a top shift gesture in the sensing area of the sensing unit 10, and the top shift gesture is firstly top shifting a hand, and secondly down shifting the hand. In FIG. 5M, the user may make a down shift gesture in the sensing area of the sensing unit 10, and the down shift gesture is firstly down shifting a hand, and secondly up shifting the hand.

Figure 6:
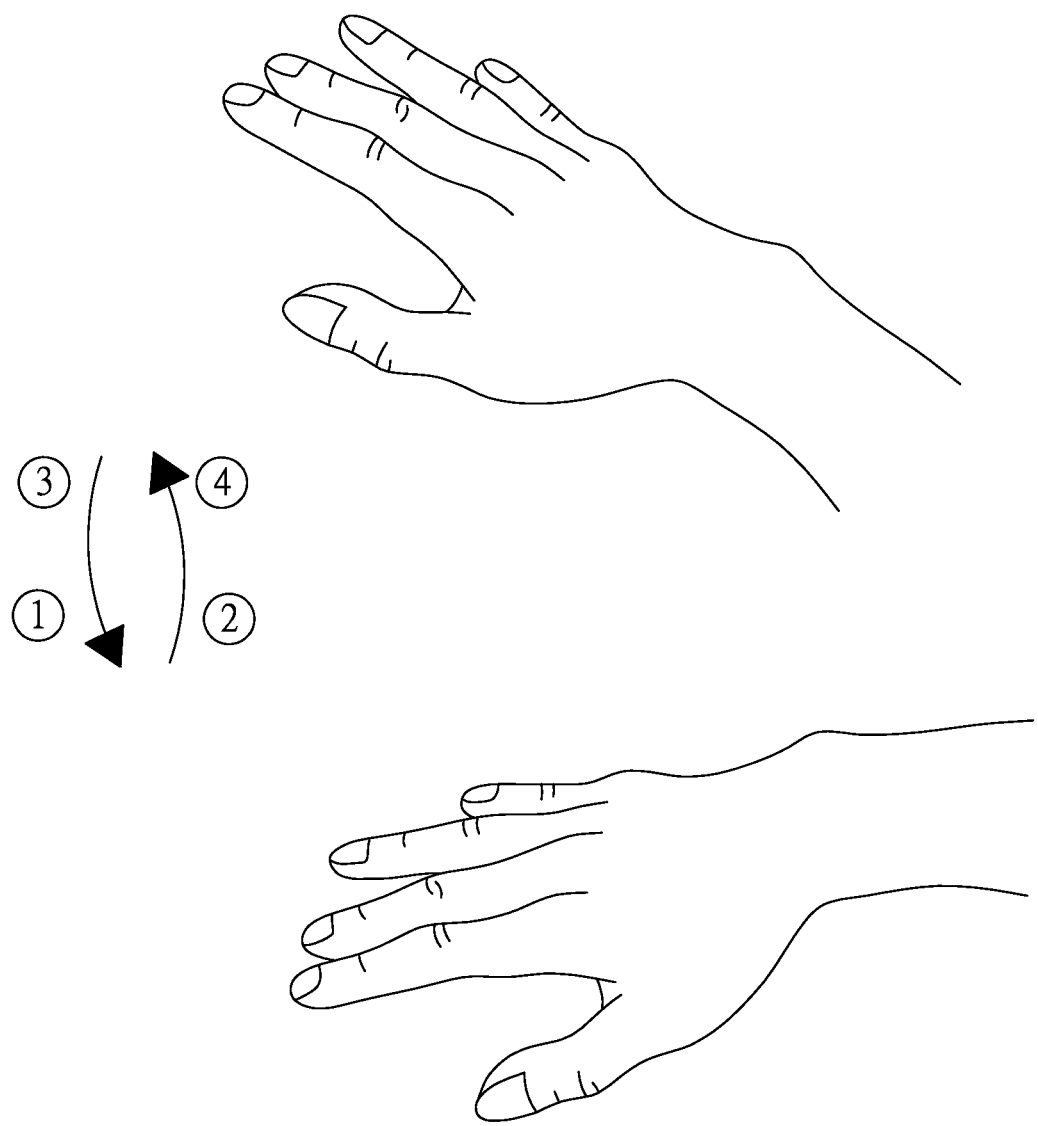
FIG. 6 is a schematic diagram of other return gesture.

For example, with reference to FIG. 6, the user may implement the other communication-based return gesture, and the user may move a hand down-up-down-up in the sensing area of the sensing unit 10.

When the above-mentioned gestures are done by the user, the user implements the return gesture.

Figure 7:
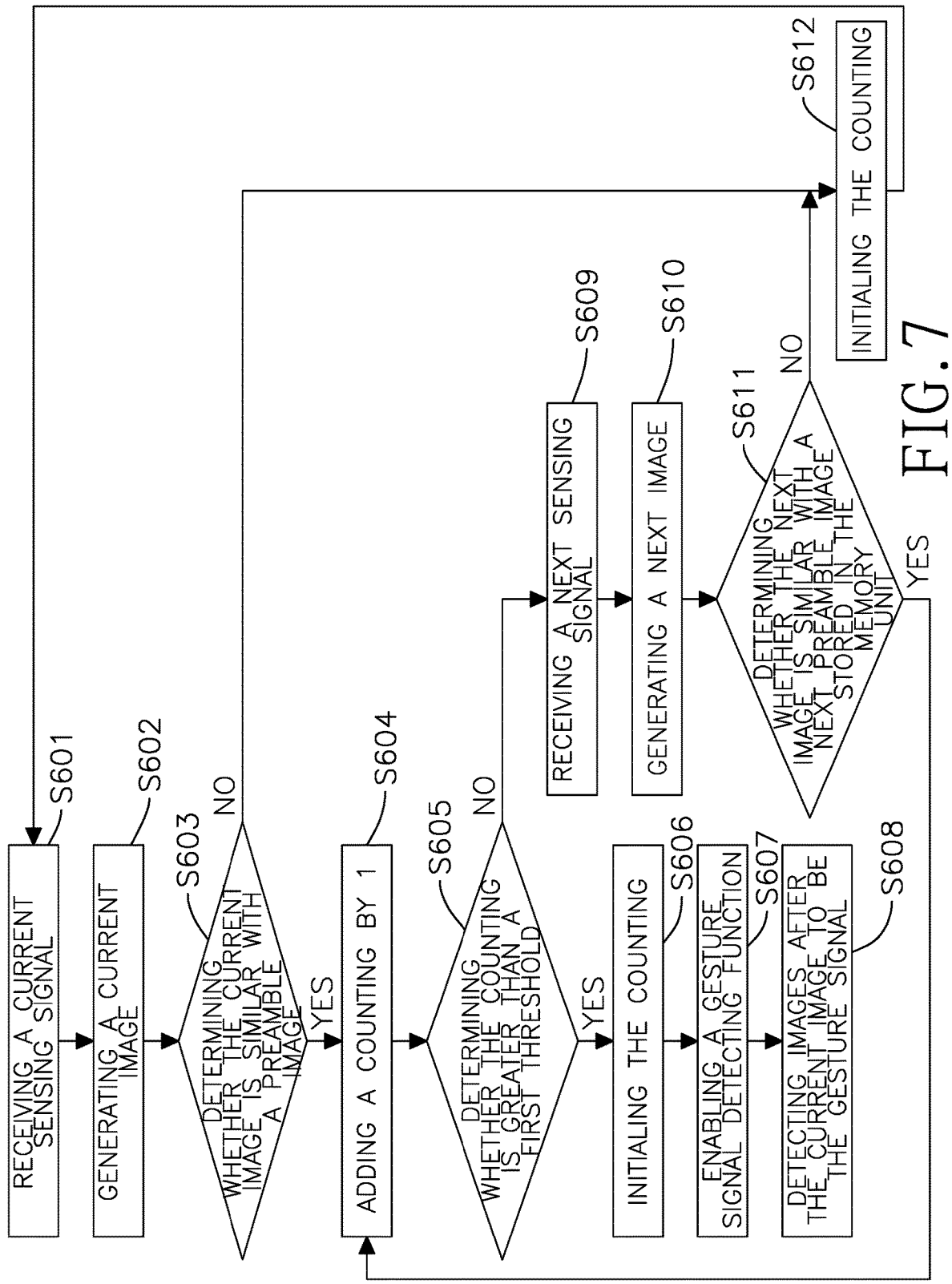
FIG. 7 is a flowchart of an embodiment of a preamble gesture of the generic gesture detecting method of the present invention.

With reference to FIG. 7, the generic gesture detecting method and the generic gesture detecting device may be used to detect a preamble gesture. The preamble gesture is a gesture which firstly makes preamble motions, and secondly makes gesture motions.

In the embodiment, the memory unit 20 stores a plurality of stored images, the stored images are preamble images, and the preamble images are arranged in sequence. The generic gesture detecting method is executed by the processing unit 30, and includes steps of:

receiving a current sensing signal from a sensing unit (S601);

generating a current image according to the current sensing signal (S602);

determining whether the current image is similar with a first preamble image stored in the memory unit (S603);

when the current image is similar with the first preamble image stored in the memory unit, adding a counting by 1 (S604), and determining whether the counting is greater than a first threshold (S605);

when the counting is greater than the first threshold, initialing the counting (S606), enabling a gesture signal detecting function (S607), and detecting images after the current image to be the gesture signal (S608);

when the counting is smaller than the first threshold, receiving a next sensing signal (S609), generating a next image according to the next sensing signal (S610), and determining whether the next image is similar with a next preamble image stored in the memory unit (S611);

when the next image is similar with the next preamble image stored in the memory unit, returning to the step S604;

when the next image is different from the next preamble images stored in the memory unit, initialing the counting (S612), and returning to the step S601;

when the current image is different from the first preamble image stored in the memory unit, going to the step S612, and returning to the step S601.

Since the preamble images are stored into the memory unit 20, the present invention can determine whether the current images are similar with the preamble images. When the current images are similar with the preamble images, the processing unit 10 can detect the next images received from the sensing unit 10 after the current images are determined to be the gesture signal.

Figure 8:
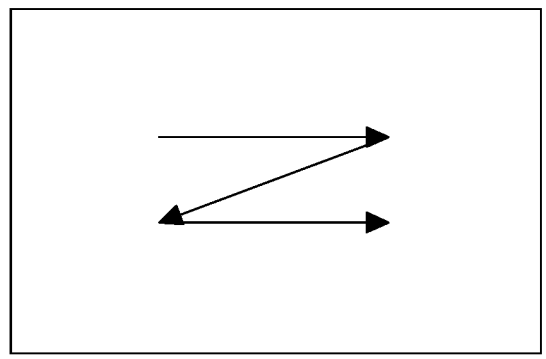
FIG. 8 is a schematic diagram of the preamble gesture.
Figure 9A:
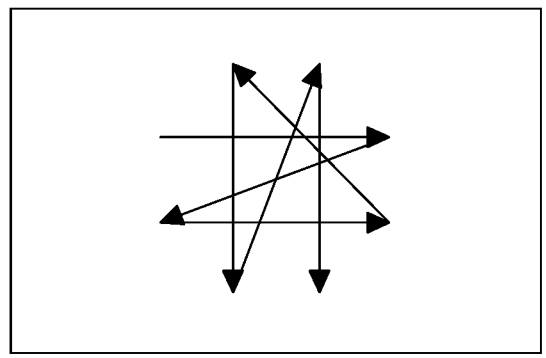
FIGS. 9A-9C are each respectively a schematic diagram of the preamble gesture.
Figure 9B:
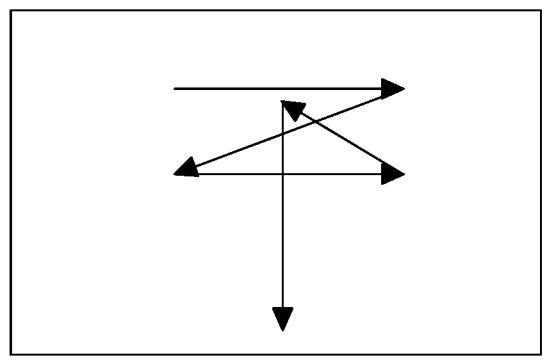
Figure 9C:
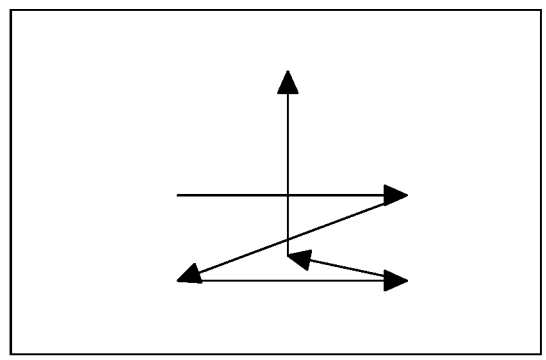

For example, with reference to FIGS. 8, and 9A-9C, the user may implement a sign-language-based preamble gesture. In FIG. 8, a preamble sign of the preamble gesture is shown. In FIG. 9A, the user may firstly draw the preamble sign, and secondly draw the sharp sign in the sensing area of the sensing unit 10. In FIG. 9B, the user may firstly draw the preamble sign, and secondly draw the down sign in the sensing area of the sensing unit 10. In FIG. 9C, the user may firstly draw the preamble sign, and secondly draw the up sign in the sensing area of the sensing unit 10. When the above-mentioned signs are drawn by the user, the user implements the preamble gesture.

Figure 10A:
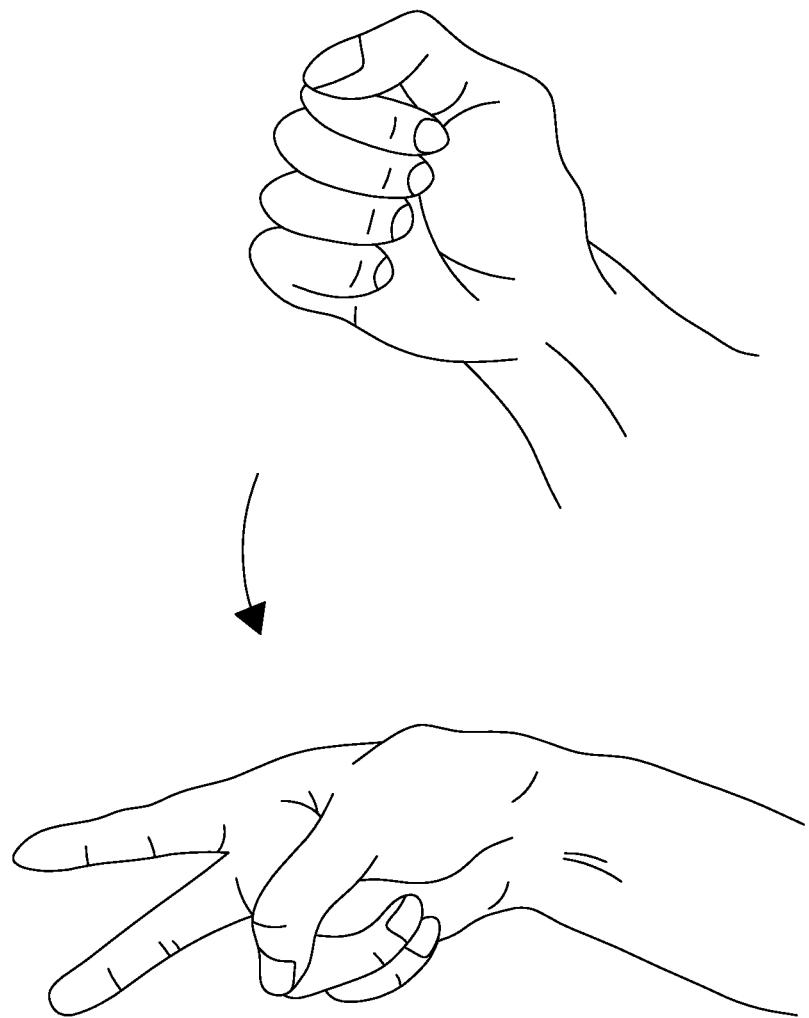
FIGS. 10A-10C are each respectively a schematic diagram of another preamble gesture.
Figure 10B:
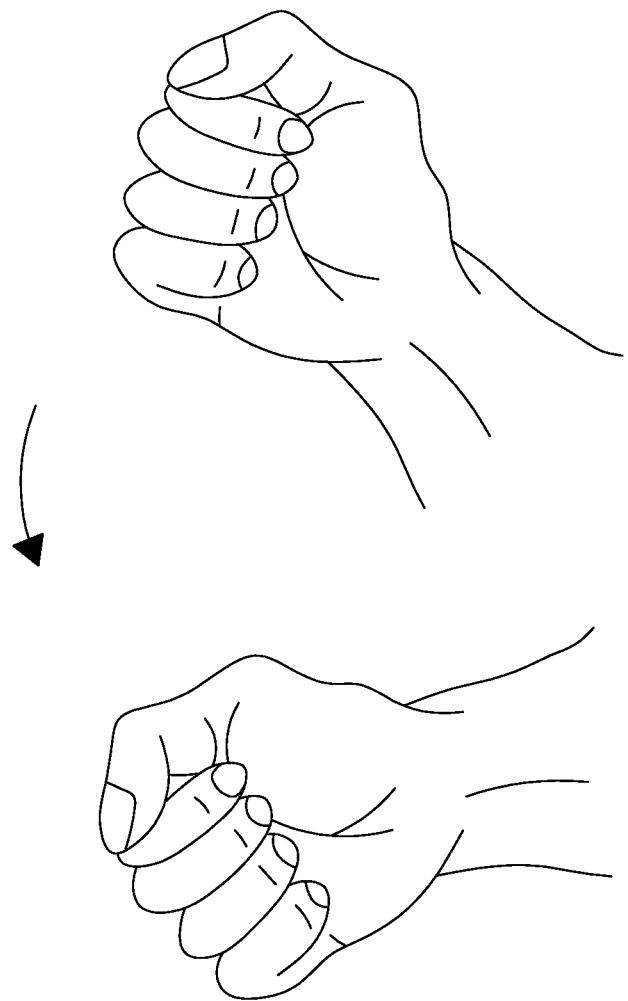
Figure 10C:
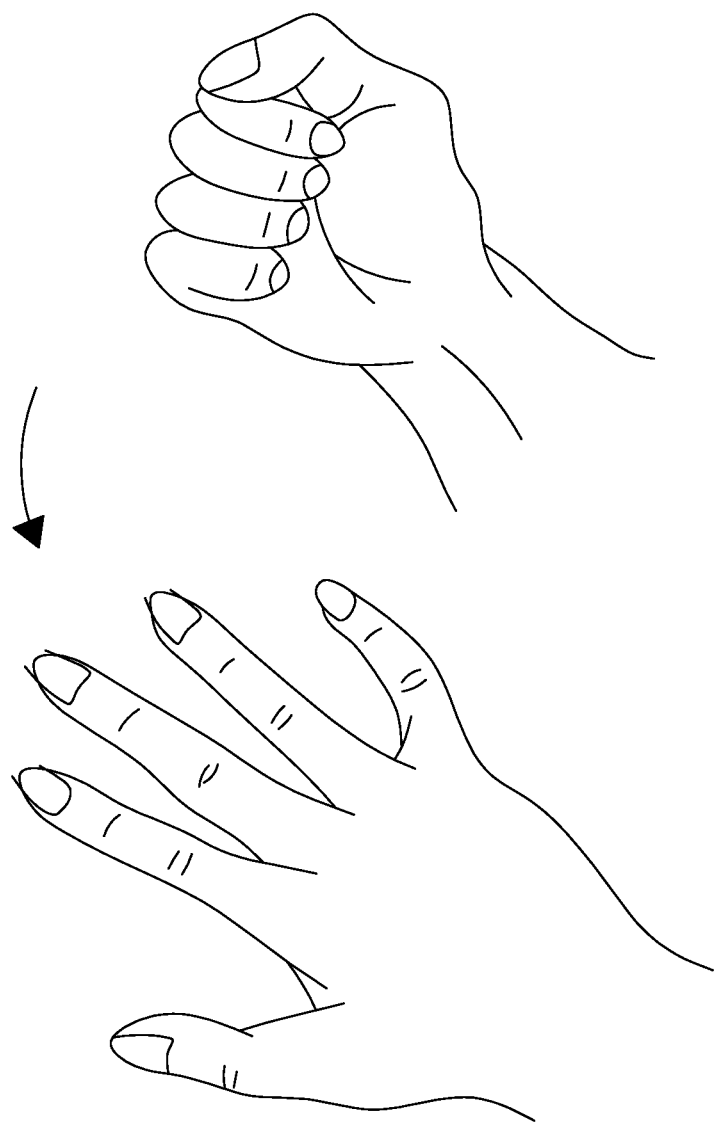

For example, with reference to FIGS. 10A-10C, the user may implement a communication-based preamble gesture, and the user may firstly clench a first to implement a preamble, and secondly make a gesture in the sensing area of the sensing unit 10.

In FIG. 10A, the user may make a scissor gesture in the sensing area of the sensing unit 10. In FIG. 10B, the user may make a stone gesture in the sensing area of the sensing unit 10. In FIG. 10C, the user may make a paper gesture in the sensing area of the sensing unit 10.

For example, with reference to FIGS. 11A-11D, the user may implement another communication-based preamble gesture.

Figure 11A:
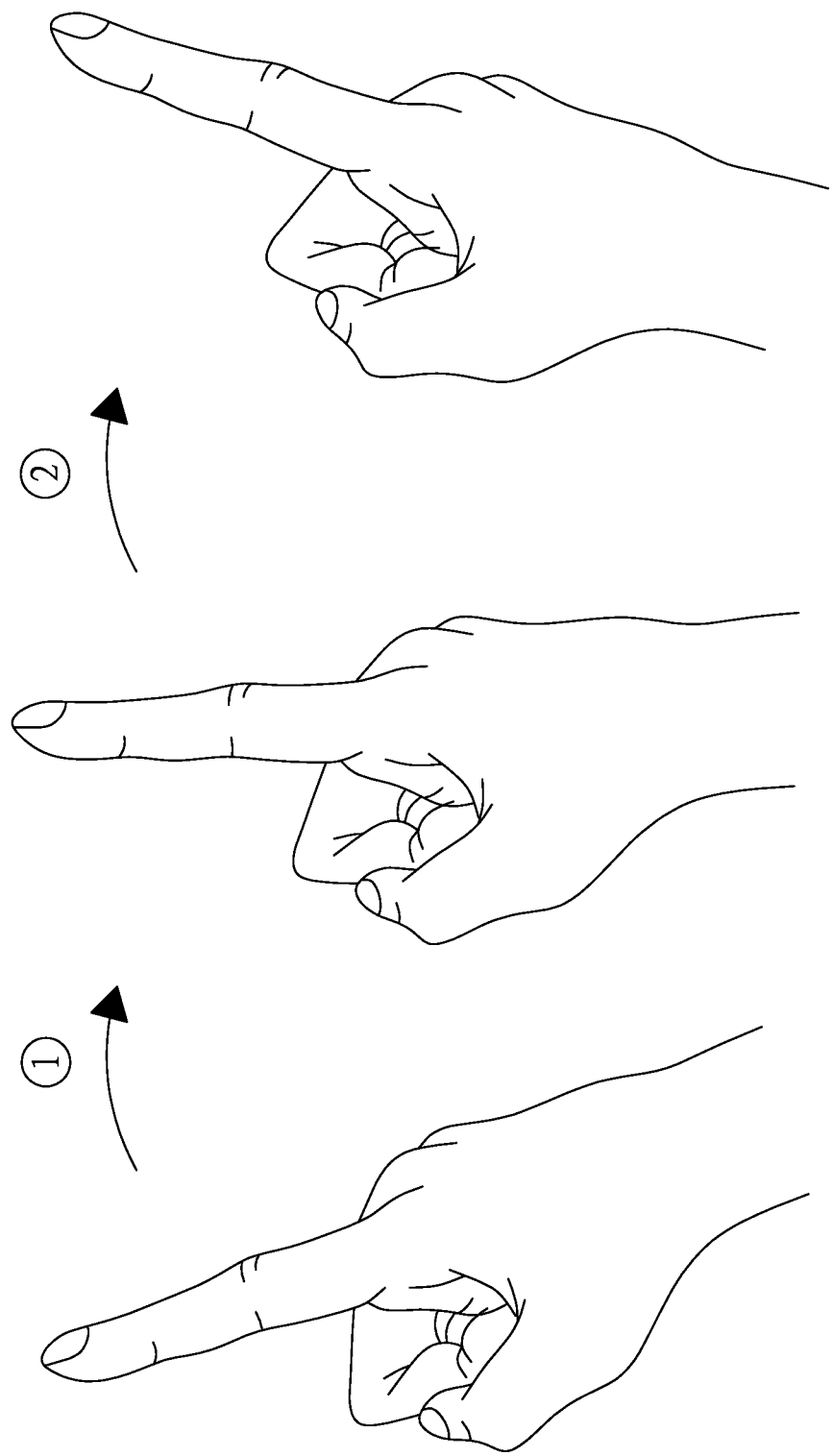
FIGS. 11A-11D are each respectively a schematic diagram of other preamble gesture.

In FIG. 11A, the user may firstly extend the index finger and move the extended index finger to the right once in the sensing area of the sensing unit 10 for implementing a preamble, and the user may secondly move the extended index finger to the right once again in the sensing area of the sensing unit 10 for making a gesture in the sensing area of the sensing unit 10.

Figure 11B:
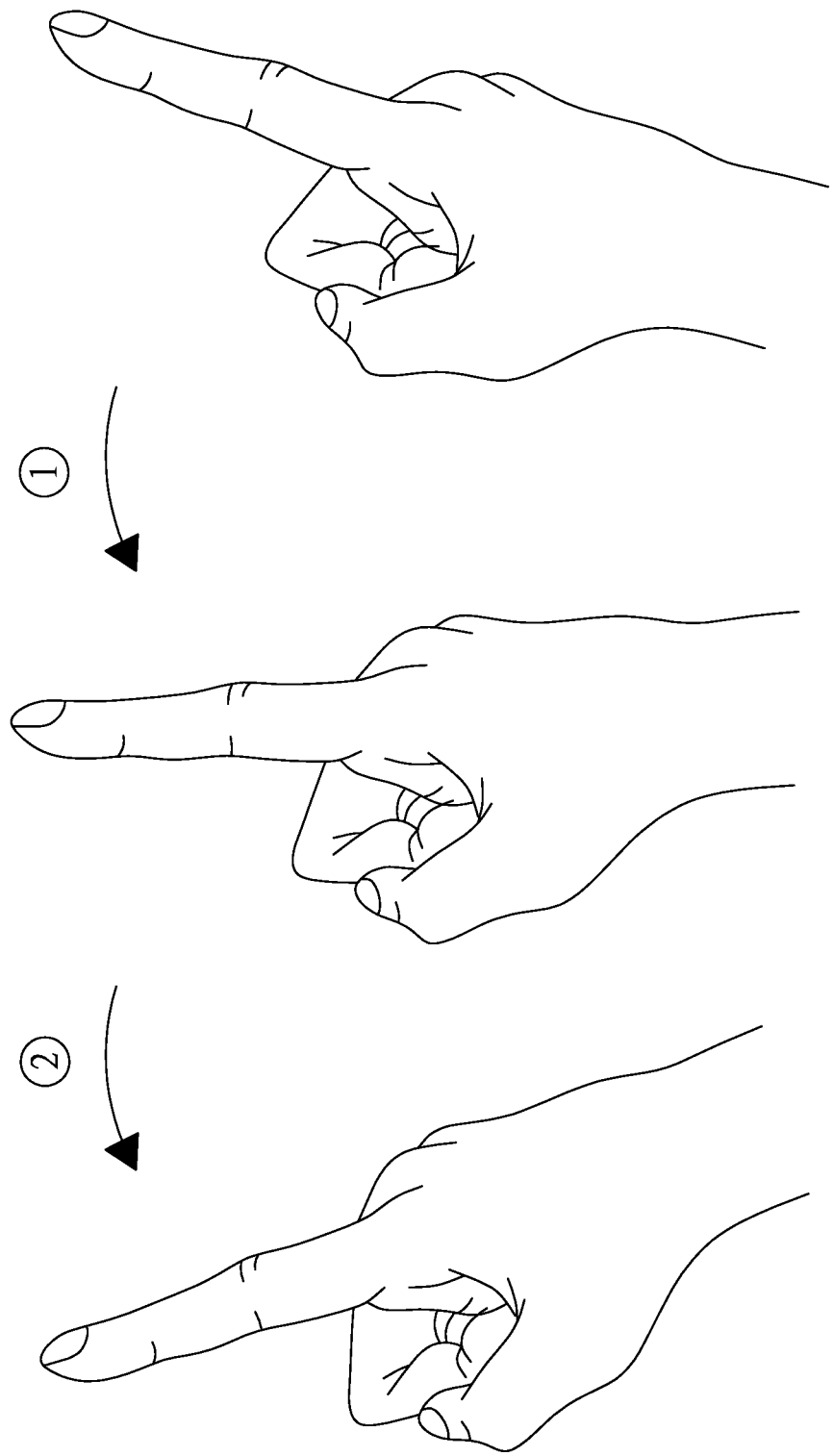

In FIG. 11B, the user may firstly extend the index finger and move the extended index finger to the left once in the sensing area of the sensing unit 10 for implementing a preamble, and the user may secondly move the extended index finger to the left once again in the sensing area of the sensing unit 10 for making a gesture in the sensing area of the sensing unit 10.

Figure 11C:
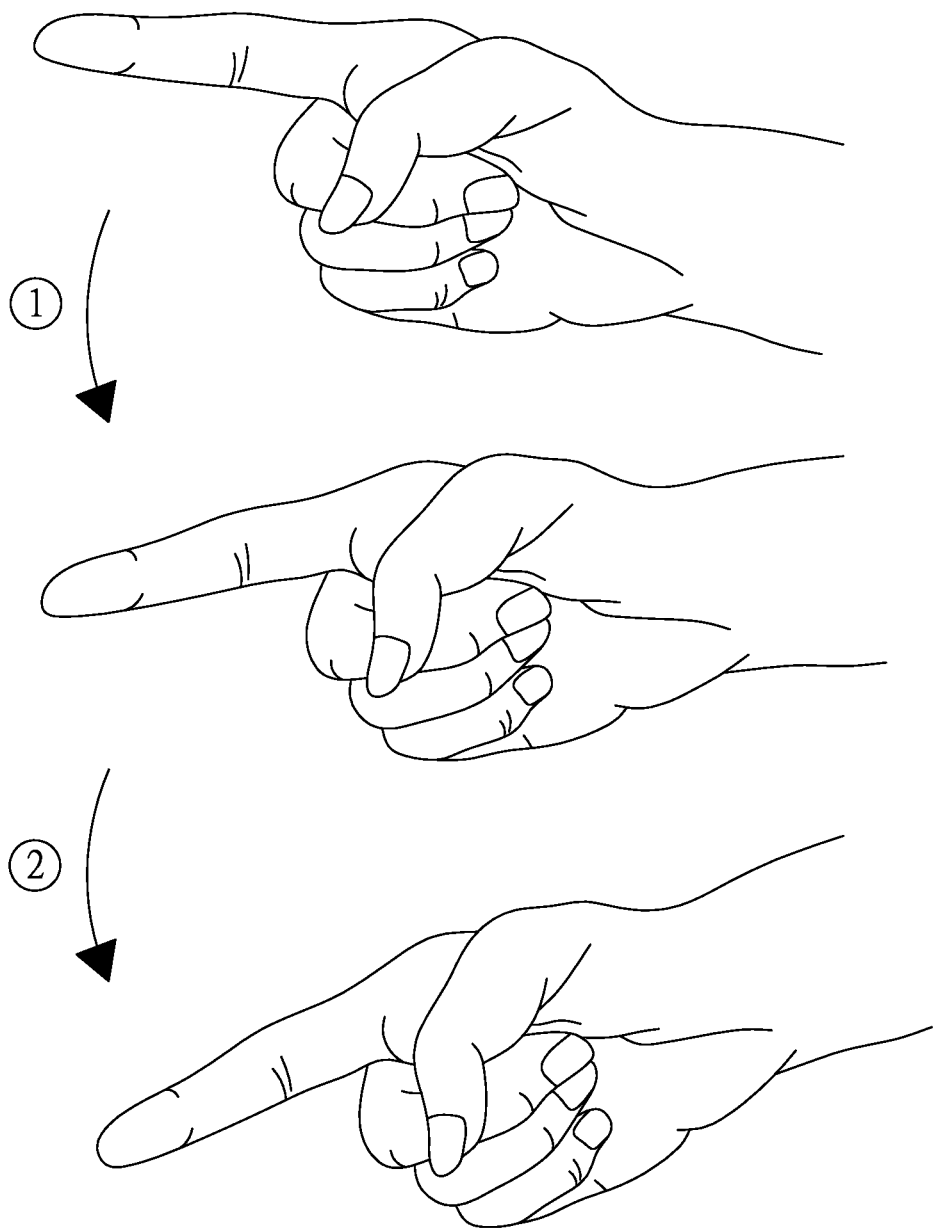

In FIG. 11C, the user may firstly extend the index finger and move the extended index finger to the down once in the sensing area of the sensing unit 10 for implementing a preamble, and the user may secondly move the extended index finger to the down once again in the sensing area of the sensing unit 10 for making a gesture in the sensing area of the sensing unit 10.

Figure 11D:
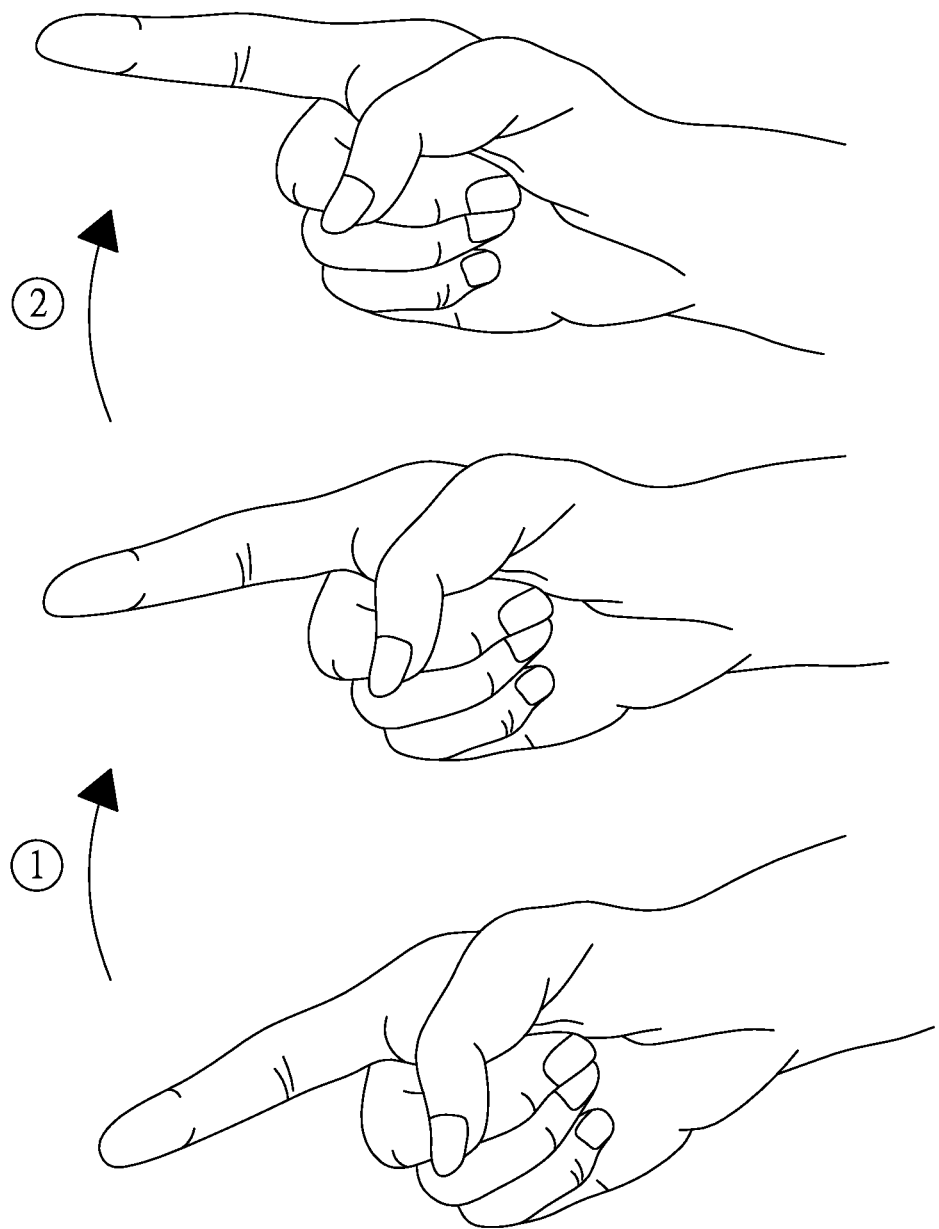

In FIG. 11D, the user may firstly extend the index finger and move the extended index finger to the up once in the sensing area of the sensing unit 10 for implementing a preamble, and the user may secondly move the extended index finger to the up once again in the sensing area of the sensing unit 10 for making a gesture in the sensing area of the sensing unit 10.

Figure 12:
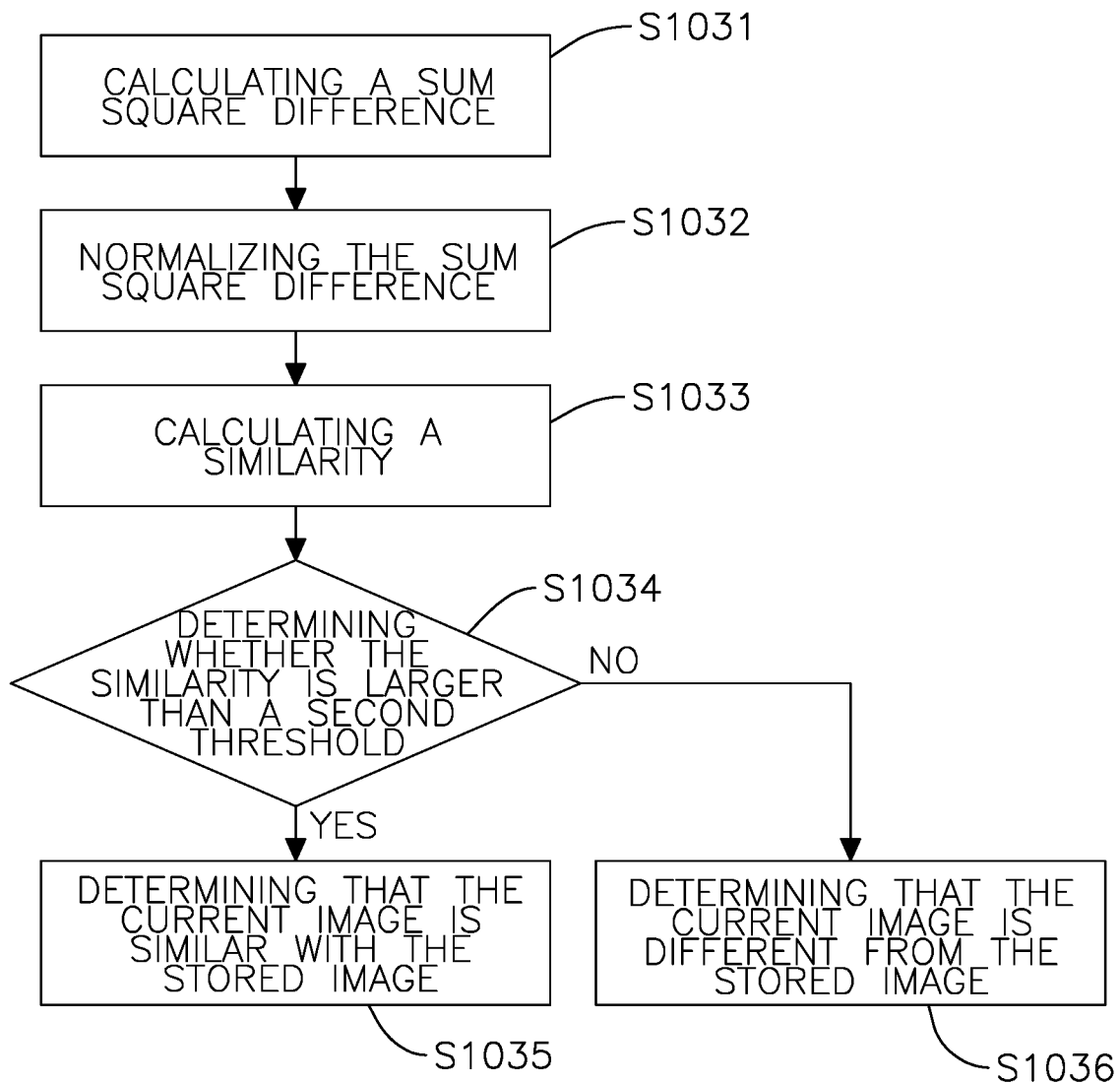
FIG. 12 is a flowchart of an embodiment for determining whether the current image is similar with a stored image.

Moreover, with reference to FIG. 12, the current image and the stored image respectively include a plurality of range data, and the step S103 determining whether the current image is similar with a stored image stored in a memory unit further includes sub-steps of:

calculating a sum square difference of the data of the current image and the data of the stored image (S1031);

normalizing the sum square difference (S1032);

calculating a similarity according to the sum square difference (S1033);

determining whether the similarity is larger than a second threshold (S1034);

when the similarity is larger than the second threshold, determining that the current image is similar with the stored image (S1035);

when the similarity is smaller than the second threshold, determining that the current image is different from the stored image (S1036).

In step S1031, the sum square difference is calculated by the following formula:

$$S_{sq} = \sum_{\substack{n \in N \\ m \in M}} (J[n, m] - I[n, m])^2$$

$S_{sq}$ is the sum square difference, N, M are boundary values of the RDI, and $J[n, m]$, $I[n, m]$ are range values of the RDI.

In step S1032, the sum square difference is normalized by the following formula:

$$NSSD = \frac{S_{sq}}{\sqrt{\sum J[n, m]^2 \times \sum I[n, m]^2}}$$

NSSD is the normalized sum square difference.

In step S1033, the similarity is calculated by the following formula:

$$\text{Similarity} = 1 - NSSD$$

What is claimed is:

1. A generic gesture detecting method, comprising steps of:
   receiving a current sensing signal from a sensing unit;
   generating a current image according to the current sensing signal;
   determining whether the current image is similar with a stored image stored in a memory unit;
   when the current image is similar with the stored image, detecting the current image and the stored image to be a gesture signal; and
   when the current image is different from the stored image, storing the current image into the memory unit, and returning to the step of receiving a current sensing signal,
   wherein the gesture signal is transmitted to a gesture recognition device for recognizing the gesture signal;
   wherein the sensing unit is a Doppler radar;
   wherein the current image and the stored image respectively comprise a plurality of range data; and
   wherein the step of determining whether the current image is similar with a stored image stored in a memory unit further comprises sub-steps of:
      calculating a sum square difference of the range data of the current image and the range data of the stored image;
      normalizing the sum square difference;
      calculating a similarity according to the sum square difference;
      determining whether the similarity is larger than a second threshold;
      when the similarity is larger than the second threshold, determining that the current image is similar with the stored image; and
      when the similarity is smaller than the second threshold, determining that the current image is different from the stored image.

2. The generic gesture detecting method as claimed in claim 1, wherein the current image is a current range-doppler image (RDI); and
   wherein the current RDI is generated by a feature extractor.

3. The generic gesture detecting method as claimed in claim 1, wherein the memory unit stores a plurality of stored images;
   wherein the step of determining whether the current image is similar with a stored image stored in a memory unit further comprises sub-steps of:
   determining whether the current image is similar with any one of the stored images stored in the memory unit;
   when the current image is similar with any one of the stored images stored in the memory unit, detecting the current image and all the stored images stored in the memory unit to be the gesture signal; and
   when the current image is different from any one of the stored images stored in the memory unit, storing the current image into the memory unit, and returning to the step of receiving a current sensing signal.

4. The generic gesture detecting method as claimed in claim 1, wherein the memory unit stores a plurality of stored images, the stored images are preamble images, and the preamble images are arranged in sequence;
   wherein the step of determining whether the current image is similar with a stored image stored in a memory unit further comprises sub-steps of:
   determining whether the current image is similar with a first preamble image among the preamble images stored in the memory unit;
   when the current image is similar with the first preamble image stored in the memory unit, adding a counting by 1, and determining whether the counting is greater than a first threshold;
   when the counting is greater than the first threshold, initialing the counting, enabling a gesture signal detecting function, and detecting images after the current image to be the gesture signal;
   when the counting is smaller than the first threshold, receiving a next sensing signal, generating a next image according to the next sensing signal, and determining whether the next image is similar with a next preamble image among the preamble images stored in the memory unit;
   when the next image is similar with the next preamble image stored in the memory unit, returning to the step of adding a counting by 1;
   when the next image is different from the next preamble image stored in the memory unit, initialing the counting, and returning to the step of receiving a current sensing signal; and
   when the current image is different from the first preamble image stored in the memory unit, initialing the counting, and returning to the step of receiving a current sensing signal.

5. A generic gesture detecting device, comprising:
   a sensing unit, sensing a sensing signal;
   a memory unit, storing a stored image; and
   a processing unit, electrically connected to the sensing unit and the memory unit;
   wherein the processing unit receives a current sensing signal from the sensing unit, generates a current image according to the current sensing signal, and determines whether the current image is similar with the stored image stored in the memory unit;
   wherein when the current image is similar with the stored image, the processing unit detects the current image and the stored image to be a gesture signal;
   wherein when the current image is different from the stored image, the processing unit stores the current image into the memory unit, and receives the current sensing signal again;
   wherein the gesture signal is transmitted to a gesture recognition device for recognizing the gesture signal;
   wherein the sensing unit is a Doppler radar;
   wherein the current image and the stored image respectively comprise a plurality of range data;
   wherein the processing unit further calculates a sum square difference of the range data of the current image and the range data of the stored image, normalizes the sum square difference, calculates a similarity according to the sum square difference, and determines whether the similarity is larger than a second threshold;
   wherein when the similarity is larger than the second threshold, the processing unit determines that the current image is similar with the stored image; and wherein when the similarity is smaller than the second threshold, the processing unit determines that the current image is different from the stored image.

6. The generic gesture detecting device as claimed in claim 5,
wherein the current image is a current range-doppler image (RDI);
wherein the processing unit comprises a feature extractor, and the current RDI is generated by the feature extractor.

7. The generic gesture detecting device as claimed in claim 5, wherein the memory unit stores a plurality of stored images;
wherein the processing unit further determines whether the current image is similar with any one of the stored images;
wherein when the current image is similar with any one of the stored images, the processing unit detects the current image and all the stored images stored in the memory unit to be the gesture signal;
wherein when the current image is different from any one of the stored images, the processing unit stores the current image into the memory unit, and receives the current sensing signal again.

8. The generic gesture detecting device as claimed in claim 5, wherein the memory unit stores a plurality of stored images, the stored images are preamble images, and the preamble images are arranged in sequence;
wherein the processing unit further determines whether the current image is similar with a first preamble image among the preamble images stored in the memory unit;
wherein when the current image is similar with the first preamble image, the processing unit adds a counting by 1, and determines whether the counting is greater than a first threshold;
wherein when the counting is greater than the first threshold, the processing unit initializes the counting, enables a gesture signal detecting function, and detects images after the current image to be the gesture signal;
wherein when the counting is smaller than the first threshold, the processing unit receives a next sensing signal, generates a next image according to the next sensing signal, and determines whether the next image is similar with a next preamble image among the preamble images stored in the memory unit;
wherein when the next image is similar with the next preamble image, the processing unit adds the counting by 1, and determines whether the counting is greater than the first threshold again;
wherein when the next image is different from the next preamble image, the processing unit initializes the counting, and receives the current sensing signal again;
wherein when the current image is different from the first preamble image, the processing unit initializes the counting, and receives the current sensing signal again.

\* \* \* \* \*